US008428980B2

(12) United States Patent
Blaszka et al.

(10) Patent No.: US 8,428,980 B2
(45) Date of Patent: Apr. 23, 2013

(54) DEVICE AND METHOD FOR RESERVING TRAVEL PRODUCTS

(75) Inventors: Thierry Blaszka, Nice (FR); Gilles Chaumont, Nice (FR); Rudy Daniello, Nice (FR); Cedric Dourthe, Nice (FR); Frederic Hoff, Nice (FR)

(73) Assignee: Amadeus S.A.S., Sophia Antipolis (FR)

( * ) Notice: Subject to any disclaimer, the term of this patent is extended or adjusted under 35 U.S.C. 154(b) by 1135 days.

(21) Appl. No.: 11/597,472

(22) PCT Filed: May 24, 2005

(86) PCT No.: PCT/EP2005/052375
§ 371 (c)(1),
(2), (4) Date: Nov. 22, 2006

(87) PCT Pub. No.: WO2005/116883
PCT Pub. Date: Dec. 8, 2005

(65) Prior Publication Data
US 2007/0233530 A1    Oct. 4, 2007

Related U.S. Application Data

(60) Provisional application No. 60/574,218, filed on May 26, 2004.

(30) Foreign Application Priority Data

May 26, 2004  (EP) .................................... 04102309

(51) Int. Cl.
*G06Q 10/00*    (2012.01)
*G06Q 30/00*    (2012.01)
(52) U.S. Cl.
USPC ............................................ 705/5; 705/7.35

(58) Field of Classification Search ............. 705/5, 7.35; 345/348
See application file for complete search history.

(56) References Cited

U.S. PATENT DOCUMENTS 4,862,357 A    8/1989  Ahlstrom et al. .............. 364/407
5,832,454 A   11/1998  Jafri et al. ......................... 705/6

(Continued)

FOREIGN PATENT DOCUMENTS

JP    2002-117259    4/2002
JP    2003-216701    7/2003
WO    01/03032      1/2001

OTHER PUBLICATIONS

"Internet Wayback Machine Document", www.EasyJet.com, Online, Jun. 21, 2000, XP002296015.
"Internet Wayback Machine", www.EasyJet.com, Online, Sep. 12, 1998, XP002296016.

*Primary Examiner* — George Chen
(74) *Attorney, Agent, or Firm* — Wood, Herron & Evans, LLP

(57) ABSTRACT

A central computer system for processing user travel requests including an outbound journey and an inbound journey, includes elements for calculating and returning information on travel products to user, including sale prices, the central computer system being accessible from at least one user terminal, and including:
  A travel solutions search engine that can access at least one travel segment database (FDB) and having elements for determining outbound segments and inbound segments that comply with input criteria;
  A fare search engine having elements to determine the fare associated with possible travel solutions;
  A travel products grouping engine that applies grouping criteria which include at least one fare equivalence criterion;
  Elements for extracting the outbound and inbound segments from each group of travel products;
  Elements for displaying information on at least one group of travel products on the user terminal, separating the outbound segments and inbound segments.

19 Claims, 6 Drawing Sheets

U.S. PATENT DOCUMENTS

| | | |
|---|---|---|
| 6,023,679 A | 2/2000 | Acebo et al. .................... 705/5 |
| 6,236,938 B1 | 5/2001 | Atkinson et al. .............. 701/214 |
| 6,307,572 B1 * | 10/2001 | DeMarcken et al. ......... 715/763 |
| 6,418,415 B1 * | 7/2002 | Walker et al. .................. 705/26 |
| 7,194,417 B1 | 3/2007 | Jones ............................... 705/5 |
| 7,305,356 B2 | 12/2007 | Rodon ............................ 705/27 |
| 7,428,596 B2 | 9/2008 | Grandemange et al. ...... 709/238 |
| 2002/0022981 A1 * | 2/2002 | Goldstein ......................... 705/6 |
| 2002/0143587 A1 | 10/2002 | Champernowne |
| 2005/0033614 A1 * | 2/2005 | Lettovsky et al. ................ 705/5 |

\* cited by examiner

X: Definition of travel solutions
XX: Combining fares
XXX: Grouping travel products
☒ : Producing a separate display for outbound segments and inbound segments in each group

| ❶ Search | ❷ Calendar | ❸ Results | ❹ Passengers | ❺ Order | ❻ Confirmation |

| FF1 | FF2 | FF3 | FF4 | FF5 |
|---|---|---|---|---|
| Price: | ⊙ 1295 $ | ○ 1695 $ | ○ 1950 $ | ○ 2190 $ | ○ 2290 $ |

| Outbound flights (at this price) | | | | | Sydney to London – Saturday 16 May 2003 | | |
|---|---|---|---|---|---|---|---|
| Selection | From | | To | | Flights | Duration | Stop over | Type of plane |
| ○ | Sydney | 16:20 | London | 04:55 + 1 day | QF319 | 23 hr 20 min | 1 | 747-400 |
| ○ | Sydney | 17:00 | London | 05:40 + 1 day | QF301 | 23hr 30 min | 1 | 747-400 |
| ○ | Sydney | 17:00 | Singapore | 21:40 | QF005 | 22hr 55 min | 1 | 747-400 |
|  | Singapore | 22:40 | London | 10:30 + 1 day | BA09 |  | 1 | 747-400 |
| ○ | Sydney | 22:15 | London | 10:35 + 1 day | QF81 | 22hr 55 min | 1 | 747-400 |
|  | Sydney | 16:20 | London | 04:55 + 1 day | QF319 |  | 1 | 747-400 |
| ○ | Sydney | 17:00 | London | 05:40 + 1 day | QF301 | 23hr 30 min | 1 | 747-400 |
| ○ | Sydney | 17:00 | Singapore | 21:40 | QF005 | 23hr 55 min | 1 | 747-400 |
|  | Singapore | 22:40 | London | 10:30 + 1 day | BA09 |  | 1 | 747-400 |
| ○ | Sydney | 22:15 | London | 10:35 + 1 day | QF31 | 22hr 55 min | 1 | 747-400 |
| ○ | Sydney | 22:15 | London | 10:35 + 1 day | QF31 | 22hr 55 min | 1 | 747-400 |
| ○ | Sydney | 22:15 | London | 10:35 + 1 day | QF31 | 22hr 55 min | 1 | 747-400 |
| ○ | Sydney | 22:15 | London | 10:35 + 1 day | QF31 | 22hr 55 min | 1 | 747-400 |
| ○ | Sydney | 22:15 | London | 10:35 + 1 day | QF31 | 22hr 55 min | 1 | 747-400 |
| ○ | Sydney | 22:15 | London | 10:35 + 1 day | QF31 | 22hr 55 min | 1 | 747-400 |
| ○ | Sydney | 22:15 | London | 10:35 + 1 day | QF31 | 22hr 55 min | 1 | 747-400 |

| Inbound flights (at this price) | | | | | London to Sydney – Sunday 24 May 2003 | | |
|---|---|---|---|---|---|---|---|
| Selection | From | | To | | Flights | Duration | Stop over | Type of plane |
| ○ | London | 16:20 | London | 04:55 + 1 day | QF319 | 23 hr 20 min | 1 | 747-400 |
| ○ | London | 17:00 | London | 05:40 + 1 day | QF301 | 23hr 30 min | 1 | 747-400 |
| ○ | London | 17:00 | Singapore | 21:40 | QF005 | 22hr 55 min | 1 | 747-400 |
|  | Singapore | 22:40 | Sydney | 10:30 + 1 day | BA09 |  | 1 | 747-400 |
| ○ | London | 22:15 | Sydney | 10:35 + 1 day | QF81 | 22hr 55 min | 1 | 747-400 |
|  | London | 16:20 | Sydney | 04:55 + 1 day | QF319 |  | 1 | 747-400 |
| ○ | London | 17:00 | Sydney | 05:40 + 1 day | QF301 | 23hr 30 min | 1 | 747-400 |
| ○ | London | 17:00 | Singapore | 21:40 | QF005 | 23hr 55 min | 1 | 747-400 |
| ○ | Singapore | 22:40 | Sydney | 10:30 + 1 day | BA09 |  | 1 | 747-400 |
| ○ | London | 22:15 | Sydney | 10:35 + 1 day | QF31 | 22hr 55 min | 1 | 747-400 |
| ○ | London | 22:15 | Sydney | 10:35 + 1 day | QF31 | 22hr 55 min | 1 | 747-400 |
| ○ | London | 22:15 | Sydney | 10:35 + 1 day | QF31 | 22hr 55 min | 1 | 747-400 |
| ○ | London | 22:15 | Sydney | 10:35 + 1 day | QF31 | 22hr 55 min | 1 | 747-400 |
| ○ | London | 22:15 | Sydney | 10:35 + 1 day | QF31 | 22hr 55 min | 1 | 747-400 |
| ○ | London | 22:15 | Sydney | 10:35 + 1 day | QF31 | 22hr 55 min | 1 | 747-400 |
| ○ | London | 22:15 | Sydney | 10:35 + 1 day | QF31 | 22hr 55 min | 1 | 747-400 |

| ← Back | Have you selected your flights? | Go to Stage 3: → |

Fig. 4

| | ❶ Search | ❷ Selection dates | ❸ Selection Flights | ❹ Passengers | ❺ Order | | ❻ Confirmation |
|---|---|---|---|---|---|---|---|
| Sydney to London (return) | | | | | | | |
| | Departure | | | | | | |
| | Mon 1 Dec | Tues 2 Dec | Wed 3 Dec | Thurs 4 Dec | Fri 5 Dec | Sat 6 Dec | Sun 7 Dec |
| Return | | | | | | | |
| Thurs 4 Dec | ○ 1690 $ | ○ 1295 $ | ○ 1690 $ | | | | |
| Fri 5 Dec | ⊙ 1490 $ | ○ 1490 $ | ○ 1490 $ | ○ 1490 $ | | | |
| Sat 6 Dec | | ○ 1690 | ○ 1690 | ○ 1690 | ○ 1490 $ | | |
| Sun 7 Dec | | ○ 1295 $ | ○ 1490 $ | ○ 1490 $ | ○ 1490 $ | ○ 1490 $ | |
| Mon 8 Dec | ○ 1690 | ○ 1690 | ○ 1690 | ○ 1690 | ○ 1690 | ○ 1690 | ○ 1690 |
| Tues 9 Dec | ○ 1295 $ | ○ 1490 $ | ○ 1490 $ | ○ 1490 $ | ○ 1490 $ | ○ 1295 $ | ○ 1490 $ |
| Wed 10 Dec | ○ 1490 $ | ○ 1490 $ | | ○ 1490 $ | ○ 1490 $ | ○ 1490 $ | ○ 1490 $ |

Fig. 5

| FF1 | | | | | See description | |
|---|---|---|---|---|---|---|
| | CUR | Flights | Date | From | To | |
| Selection | 100 | F1 | D1 | Town1 | Town | More flights |
| | | F6 | D2 | Town2 | Ville1 | |
| Selection | 120 | F5 | D1 | Ville1 | Cnx1 | More flights |
| | | F7 | D1 | Cnx1 | Town | |
| | | F2 | D2 | Town2 | Cnx2 | |
| | | F4 | D2 | Cnx2 | Town | |
| FF2 | | | | | Voir description | |
| | CUR | Flights | Date | From | To | |
| Selection | 200 | F5 | D1 | Ville1 | Cnx1 | Plus de vols |
| | | F7 | D1 | Cnx1 | Ville2 | |
| | | F2 | D2 | Ville2 | Cnx2 | |
| | | F4 | D2 | Cnx2 | Ville1 | |
| FF3 | | | | | Voir description | |
| | CUR | Flights | Date | From | To | |
| Selection | 250 | F9 | D1 | Town1 | Town | More flights |
| | | F6 | D2 | Town2 | Town | |
| FF4 | | | | | See description | |
| | CUR | Flights | Date | From | To | |
| Selection | 300 | F9 | D1 | Town1 | Town | More flights |
| | | F6 | D2 | Town2 | Town | |
| FF5 | | | | | See description | |
| | CUR | Flights | Date | From | To | |
| Selection | 600 | F9 | D1 | Town1 | Town | More flights |
| | | F8 | D2 | Town2 | Town | |

Fig. 6a

| Outbound flights | | | |
|---|---|---|---|
| | Flights | From | To |
| Actuel | F1 | Town1 | Town 2 |
| Selection | F3 | Town1 | Town 2 |
| Selection | F7 | Town1 | Town 2 |
| Selection | F9 | Town1 | Town 2 |
| Selection | F15 | Town1 | Town 2 |
| Inbound flights | | | |
| | flights | From | To |
| Actuel | F6 | Town 2 | Town1 |
| Selection | F8 | Town 2 | Town1 |
| Selection | F12 | Town 2 | Town1 |
| Selection | F14 | Town 2 | Town1 |
| Selection | F20 | Town 2 | Town1 |
| Selection | F24 | Town 2 | Town1 |

Fig. 6b

DEVICE AND METHOD FOR RESERVING TRAVEL PRODUCTS

The present invention relates to a reservation device for travel products and a method for processing a request from a user via a computer software program.

The invention will have a particular application in the field of online reservation systems giving individuals or travel agents access to travel products, usually via a communications network that may be wide-ranging e.g. of the Internet type.

The proposed reservation systems enable users to browse information on travel products and, generally, purchase them. The invention relates in particular to the processing of user requests for round trip transport services. It meets the need to process a large amount of data and obtain a large number of possible travel solutions without extending processing time and exceeding the computation capacities of computer systems.

According to the state of the art, the standard procedure of processing a user request wishing to obtain information on travel products including information on sale prices, consists of a procedure that determines fares for a comprehensive itinerary including the outbound and inbound journeys.

More precisely, the outbound and inbound journeys in the proposed travel itinerary are closely linked and are considered as a single entity for the purposes of the sale.

One disadvantage of this type of procedure is that the client, even if he has defined a fairly restrained set of criteria (especially a price range), has to browse a very large number of travel options to find the combination of outbound and inbound journeys that suits him best.

In practical terms, given the very large number of possibilities for existing or potential travel itineraries, it is impossible to present them all to the client. This means that only solutions meeting a client's main criteria are selected for display to the exclusion of all others. The criteria used to select the travel plans that will eventually be proposed to the client are difficult to determine.

In short, this type of request processing method satisfies neither the client, who is faced with a large number of fairly illegible yet far from comprehensive suggestions, nor the supplier of travel products who has to use major computation resources without being able to display to users all the services that he would be in a position to offer.

U.S. Pat. No. 5,832,454 describes a computer-assisted reservation system which, early in the reservation procedure, produces a display of separate information for outbound and inbound flights on the user's computer screen. However, this display occurs before any fares are calculated : the user selects an outbound and an inbound flight then runs a fare calculation for this combination of flights only, as indicated in Column 4, lines 53 to 65 of this document.

It is easy to understand the extent to which U.S. Pat. No. 5,832,454 reduces the volume of calculations required but, at the same time, it greatly limits the amount of information available to the user. No fare processing is undertaken during the search for travel solutions. The user has no precise fare data associated with the travel solutions to help him make his selection. Indeed, the aim of the document is not to allow for a selection of the cheapest options (cf. Column 5, lines 61-62). Moreover, two processing phases are required and this is deleterious to the communications network (congestion) as well as tying up computation resources.

An alternative fare procedure currently proposed, mainly by the so-called "low-cost" airlines, consists of supplying the user with totally separate information for the outbound segments and the inbound segments on the required itinerary. The client can then choose independently a fare solution for each origin and destination travel pair.

For example, in the case of a request for a Sydney/Melbourne/Sydney return flight, an initial procedure is implemented to determine all the segments on the corresponding Sydney/Melbourne flight and provide a fare for them. The second procedure is run completely independently to determine the inbound segments on the possible Melbourne/Sydney flights and provide a fare.

The display produced on the user's monitor will consist mainly of two tables, one summarising the solutions proposed for the outbound flights and a second one summarising the solutions proposed for the inbound flights, with the corresponding fare solutions. The user can then select his preferred outbound flight solution from the first table and proceed in the same way with the second table, to obtain a solution of the type outbound/inbound, the fare of which will be exactly the sum of the individual fares of the outbound and inbound segments.

One advantage of this solution is that the user can read and choose the proposed outbound and inbound journeys freely. Having said this, a downside of this technique is that it can only be used by suppliers (e.g. airlines) with a fare structure adapted to this type of processing. In particular, the procedure excludes any special fares for inbound journeys.

Because of this, for traditional travel suppliers with an existing fare structure already in place, it seems impossible or particularly expensive to migrate their fare databases over to a computer system that would enable such a separate fare processing for outbound and inbound journeys.

There is, therefore, a need to improve the user interface by displaying commercial proposals for outbound and inbound journeys separately while preserving the standard method for calculating fares, in addition to the possibility of calculating a combined fare for round trips.

A technical problem solved by this invention is the provision of comprehensive information of fares on travel solutions, corresponding to a large volume of data but does not require excessive processing power or computation time.

To achieve it, the invention calculate at first fare travel solutions and then exploits this data to deduce other travel solutions. Processing covers only a limited number of travel solutions (e.g. this number is selected in advance and fixed at 100, 120 or 200, or the number can be dynamically adjusted depending on the results obtained with the first travel solutions processed, to maximise the system). With maximum factorisation, it is sufficient to calculate 120 travel solutions in order to define 4,800 solutions, that represents of course considerable technical progress.

The gain results in:
computational time saving (only some of the travel solutions are calculated);
maximisation of transmission capacities;
improvement to the interface with the user's computer.

Moreover, the invention provides the user with a clearer view of the commercial proposal, in particular because it can be used to suggest a large number of travel products by combining outbound and inbound flights while remaining compatible with the fare structures used by traditional travel suppliers.

There is a further function which makes the invention even more practical i.e. a calendar function that makes it easy for users to formulate a request, in a two-phase operation.

Another option displays only a few travel solutions but immediately asks the user whether he wishes to display information on other travel products at the same fare, using the "more products" function.

The present invention refers primarily to a reservation device for travel products comprising a central computer system for processing user requests for an outbound journey and an inbound journey, including means for calculating and returning information on travel products to the user, including sales prices, said central computer system is to be accessible from at least one user terminal.

According to the invention, the device includes the following:

A travel solutions search engine that can access at least one travel segment database and having means for determining outbound segments and inbound segments that comply with criteria input by the user, said input criteria to include at least one date for the outbound journey, one date for the inbound journey and data defining a travel itinerary including an outbound journey and an inbound journey, and having means for defining a predetermined number of possible travel solutions by combining outbound and inbound segments in pairs, by applying combining rules;

A fare search engine having means to determine the fare associated with possible travel solutions by accessing at least one fare database, thereby creating marketable travel products;

A travel products grouping engine that applies grouping criteria including at least one fare equivalence criterion;

Means for extracting the outbound segments and inbound segments from each group of travel products;

Means for producing display of information on at least one group of travel products on user terminal, separating the outbound segments and the inbound segments.

Depending on the preferred but not limitative embodiment, the device is such that:

The user request includes a range of outbound and/or inbound journey dates;

It includes a calendar application for each combination of outbound journey date and inbound journey date, to determine the travel product of lowest fare;

It includes the means for producing a display of data relating to the travel product that complies with the request and has the lowest fare, for each combination of outbound journey dates and inbound journey dates, on user terminal, so that the user can select a travel product for one combination of dates of outbound and inbound journeys;

It includes the means for returning said combination of outbound journey and inbound journey dates to the central system to be integrated into the input criteria as an outbound journey date and an inbound journey date.

The fare search engine is configured to determine, as a first step, the fare for possible travel solutions that have no common outbound or inbound segments;

The grouping criteria include at least one of the following criteria:
Identical legs of the segments
Identical total price per passenger
Identical fare parameters It includes a fare family database containing rules to determine the belonging to a fare family for each travel fare, said fare family database to be accessible via the fare search engine to sort travel products on the basis of fare family;

The grouping criteria include a criterion of identical fare family;

The fare family database includes commercial classes of fare families, linking one group of fare family to a predefined geographical market, for a predefined set of requested dates;

It includes the means for selecting at least one commercial class of fare families to determine travel products that meet the user's request.

The invention also relates to a user request processing method for a travel including one outbound journey and one inbound journey, wherein data relating to travel products and including sales prices is calculated and returned to the user, comprising the following stages:

Determination, by access to at least one travel segment database, of the outbound and inbound segments complying with input criteria, said input criteria comprising at least one outbound journey date, one inbound journey date and data defining an travel itinerary to include one outbound journey and one inbound journey;

Definition of predefined number of possible travel solutions by combining outbound segments and inbound segments in pairs in application of combining rules;

Determination, by accessing to a fare database, of the fare associated with possible travel solutions, thereby creating marketable travel products;

Grouping of travel products that applies grouping criteria including at least one fare equivalence criterion;

Extraction of the outbound segments and inbound segments from each group of travel products;

Production of a display of information on at least one group of travel products on user terminal separating, the outbound segments and inbound segments.

As an advantage, this method includes the following additional stages:

It includes the following preliminary stages:
Receipt of a user request including a range of outbound and/or inbound journey dates;
The request is processed using the calendar application which consists of determining the travel product having the lowest fare for each combination of outbound journey dates and inbound journey dates;
Production of a display of data relating to the travel product that complies with the request and has the lowest fare, for each combination of outbound journey dates and inbound journey dates, on the user terminal;
From user terminal, a travel product is selected for one combination of outbound journey dates and inbound journey dates;
Said combination of outbound and inbound journey dates is sent to the central computer where it is integrated in the input criteria as an outbound journey date and inbound journey date.

The fare corresponding to the various travel solutions is determined, starting with travel solutions that have no common outbound segment or inbound segment;

The grouping criteria include at least one of the following criteria:
Identical legs of segments
Identical total price per passenger
Identical fare parameters The following stages are implemented:
Access to a fare family database containing rules to determine the belonging to at least one fare family for each travel fare;

Sorting of travel products per fare family
Belonging to the same fare family is used as a grouping criterion for travel products;
Commercial classes of fare families linking at least one group of fare families to a predefined geographical market are created in the fare family database for a predetermined set of requested dates;
One or more commercial classes of fare families are selected to determine which travel products meet the user's request;
It includes, in particular, the following operations:
Display of information for a predefined number of outbound segments and inbound segments in a group of travel products;
Display of a message is produced proposing to display information for other outbound segments and inbound segments in a group of travel products;
On an input of an instruction by the user, said display of information is produced for other outbound segments and inbound segments in a group of travel products;
It also includes the following operations:
Production of a display of information on the travel products having the lowest fare in the group of travel products;
Production of a message of a display proposing to display information for at least one other group of travel products;
On an input of an instruction by the user, production of a display of information for said other group of travel products;

The invention also relates to a computer program product comprising instructions so that, when run by a computer:
It determines, by access to at least one travel segment database, the outbound segments and inbound segments complying with the input criteria that include at least one outbound journey date, one inbound journey date and data defining a travel itinerary to include one outbound and one inbound journey;
It defines possible travel solutions by combining outbound segments and inbound segments in pairs, through the application of combining rules;
It determines the fare associated with travel solutions by access to at least one fare database, thereby creating marketable travel products;
It groups the travel products by applying grouping criteria that include at least one fare equivalence criterion;
It extracts the outbound segments and the inbound segments from each group of travel products;
It produces a display of information on at least one group of travel products, separating the outbound segments and inbound segments.

The enclosed drawings are given as an example and do not indicate the limits of the invention. They represent only one embodiment of the invention and make it easy to understand.

FIG. 1 consists of a diagram showing one possible structure for the implementation of the invention device.

FIG. 4 is one example of a display produced by the invention on the user terminal.

FIG. 5 is one example of a display on a user terminal with a calendar function.

FIGS. 6a, 6b illustrate one additional type of embodiment of the invention with a display function for additional solutions.

Figure 1:
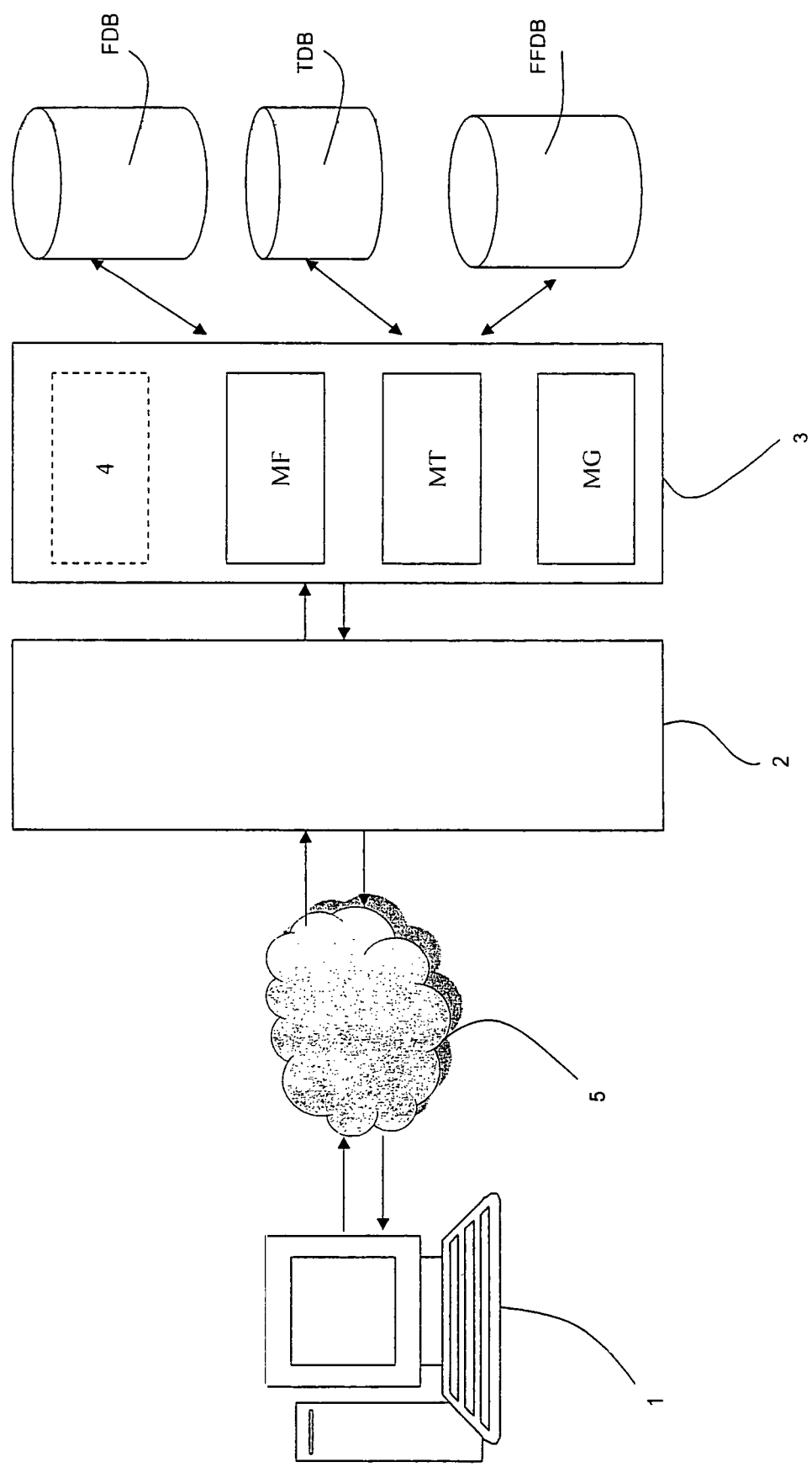

As shown in FIG. 1, the device according to the invention includes a number of components which communicate with each other via a communications network that may be wide-ranging 5.

The device provides access from user terminal 1, to which an individual such as an end client or travel agent may have access. Generally speaking, user terminal 1 is a PC equipped with a monitor and the means for inputting data.

User terminal 1 also benefits from the inclusion of browsing resources in the form of a computer browser program such as the product marketed under the registered trademark Internet Explorer. Communications devices of the modem or router type are also present.

Via user terminal 1, the user can enter and transmit requests to the device, such requests referring to a travel including an outbound journey and an inbound journey.

In the solution illustrated in FIG. 1, the request passes through a server of the type commonly referred to as an Internet server which provides the interface between user terminal 1 and other remote computer resources.

Also communicating with Internet server 2 is application server 3 which is used to implement certain resources of the invention.

Application server 3 communicates with a range of databases i.e. a travel segment database (FDB) which carries out an inventory of all existing segments that can be suggested to a client, a fare database (TDB) allowing the store of different data relating to fares applicable to travel solutions and a fare family database (FFDB) containing the rules to determine the belonging to a fare family for each travel fare, as explained below.

For the purposes of the remainder of the description, an itinerary is a complete round trip, comprising an outbound journey and an inbound journey.

The combination of outbound journey and the corresponding outbound journey date constitutes an outbound segment. Likewise, inbound segments can be created by combining an inbound journey with a corresponding travel date.

Thus, for terminological reasons, "travel solutions" in the remainder of the description shall refer to a combination of outbound segment and inbound segment.

The allocation of a fare to a travel solutions is used to create a travel product on which information can be passed back to the user, including the sale price.

As far as fare structure is concerned, the following configuration can be used, although it is given as a guideline only. It is used in the remainder of the description in the preferred embodiment of the invention.

Fares can be advantageously classified in fare families. Predefined rules are used to determine the belonging of a fare to a family.

Figure 8:
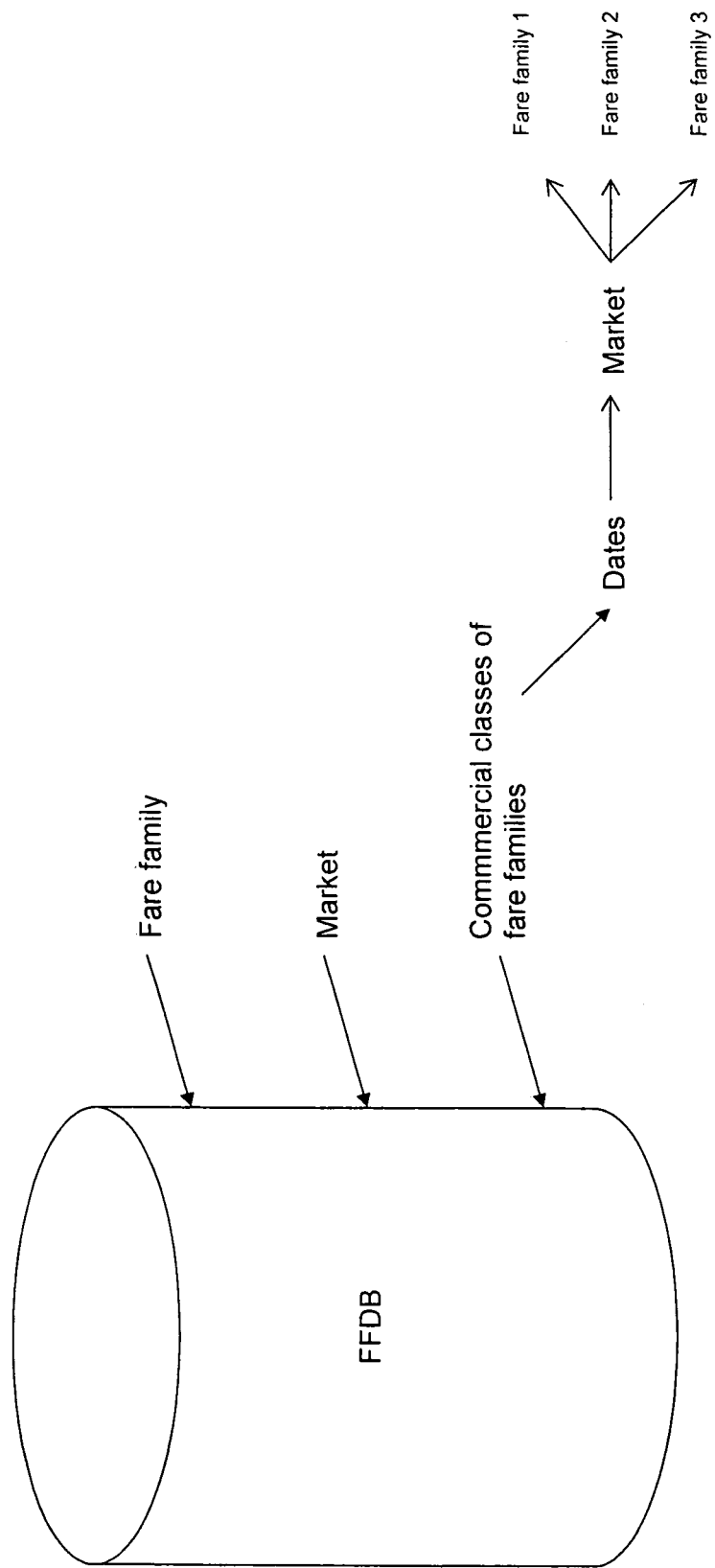
FIG. 8 illustrates one possibility for the structure of the fare family database.

In this respect, and in accordance with FIGS. 1 and 8, a fare family database (FFDB) is implemented.

This database contains rules to determine the belonging to a fare family for each travel family and is accessible by a search engine consisting of the fare search engine (MT). The information contained in the fare family database (FFDB) is shown in FIG. 8.

In this figure, fare families are entered in the database. Also defined are markets corresponding to geographical zones in which a set of fare families are applied. These markets can be national, regional or international areas. The market may also be systematically defined as a worldwide.

The fare family database is also used to define commercial classes for fare families. These commercial classes are linked with a group of fare families and a geographical market for a predefined set of travel dates.

This means that, when the relevant dates and market are known, it is possible to find fare families belonging to a commercial class of fare families and then to find out their attributes.

Commercial classes of fare families can be determined by an administrator within a travel supplier such as an airline. To process user requests for information on travel products, the rules laid down for the return of fare information are applied. In particular, the travel products proposed in response to user requests will depend on the rules laid down by the database (FFDB) administrator.

Thanks to the fare structure described, the commercial offer can be targeted for example to the type of end-user. Using a website supported by an Internet server, it will be possible to propose products that are more especially designed for young people while another site could offer products more specifically targeting professional people. It is also possible, using one and the same website, to propose to the user a selection of commercial classes of fare families to be used for the processing of their requests.

It is advantageous for the display produced on user terminal 1 to be classified in fare families comprised in the commercial class used to process the request.

In the example illustrated in FIGS. 4, 6a and 6b, the terms FF1, FF2, FF3, FF4 and FF5 correspond to fare families that can be simultaneously or successively viewed by the user.

Below is a more detailed description of the general principle behind the processing run by the present invention.

The processing requires the extraction of outbound segments and inbound segments from a group of travel products, to produce a separate display.

To this end, the travel solutions with the same value for the following attributes are grouped:
Fare family
Starting point and destination for the segment and, possibly, for the intermediate stage (e.g. a stopover)
Details of price per type of passenger including:
  Total price per passenger
  Taxes per passenger
  Additional information message (in particular, the existence of penalties, or conditions for the issue of a ticket)
Detailed fare for each requested segment, including the following:
  Fare families and fare cut-off point
  Reservation code and code for the corresponding cabin
  Types of fare (published, negotiated, business, dynamic reduction fares)
  Types of passenger discounts applied
  Fare family for each fare For a given group, the common information described above is entered in a single operation by reference to the various segments proposed, to cover each travel solutions.

According to the invention, each segment proposed for the outbound journey, combined with any segment proposed for the inbound journey within the same group of travel solutions created in accordance with the aforesaid rules of classification, is considered to have the same sales price. This enables a display to be produced for the selection of outbound segments and inbound segments separately.

Additionally, depending on the range of flights available, the number of travel solutions proposed may be significantly increased. For example, a response that complies with a standard fare procedure allows for the following combinations:
Outbound Segment1/Inbound Segment1
Outbound Segment2/Inbound Segment2
Outbound Segment3/Inbound Segment3
Outbound Segment4/Inbound Segment4
Outbound Segment5/Inbound Segment5

Thanks to the present invention, in the above example, twenty additional travel solutions can be deduced using additional combinations of segments:
Outbound Segment1/Inbound Segment2
Outbound Segment1/Inbound Segment3
Outbound Segment1/Inbound Segment4
Outbound Segment1/Inbound Segment5
Outbound Segment2//Inbound Segment1
Outbound Segment3/Inbound Segment1
Etc.

It is preferable, for reasons of efficiency and to obtain the maximum number of proposals, to begin combining pairs of outbound and inbound journeys in accordance with the following sequences:
  O1 I1, O2 I2, O3 I3, O4 I4, O5 I5, O6 I6, O7 I7, O8 I8, O9, I9, O10, I10 (in the case of ten segments O1, O2, O3, O4, O5, O6, O7, O8, O9, O10 proposed for the outbound journey and ten segments I1, I2, I3, I4, I5, I6, I7, I8, I9, I10 proposed for the inbound journey).
The combinations are then continued by combining Outbound Segment1 with the various possible inbound segments O1 I2, O1 I3, O1 I4, O1 I5, O1 I6, O1 I7, O1 I8, O1 I9, O1, I10 etc. for each of the following outbound segments (O2, O3 etc.)

Under the combining rules, it is possible to predefine a maximum number of travel solution calculations in order to limit the processing to a certain number of combinations.

Below is an example of grouped travel solutions in a simple case of flights between Paris Orly and Nice Airport (France).

EXAMPLE 1

Grouping of Travel Products

For a request for a PARIS-NICE flight on 14 Jan. 2004 and an inbound NICE-PARIS flight on 18Jan. 2004 for one adult and one child, the following travel products are proposed:
Travel product 1:
Travel solutions:
Outbound 1
Flight No. AF 6208 on 14Jan. 2004 at 10 a.m. from ORLY to NICE
Inbound 1
Flight No. AF AF6213 on 18 Jan. 2004 at 12.10 p.m. from NICE to ORLY
Fare proposal:
Fare family: AF POUR TOUS
Per adult:
Total price: 149.66 Euros
Tax: 40.66 Euros
N.B.: "Tickets cannot be exchanged before departure"

Price details:

1st table

|  | Fare class | Class | Cabin | Type of fare | Type of passenger | Fare family |
|---|---|---|---|---|---|---|
| Outbound flight | WAP10 | W | Y | Public | Adult | AFPOURTOUS |
| Inbound flight | WAP10 | W | Y | Public | Adult | AFPOURTOUS |

Per child:
Total price: 95.66 Euros
Tax: 40.66 Euros
N.B.: "Tickets cannot be exchanged before departure"
Price details:

2nd table

|  | Fare class | Class | Cabin | Type of fare | Type of passenger | Fare family |
|---|---|---|---|---|---|---|
| Outbound flight | WAP10 | W | Y | Public | Child | AFPOURTOUS |
| Inbound flight | WAP10 | W | Y | Public | Child | AFPOURTOUS |

Travel product 2:
Travel solutions:
Outbound 2
Flight No. AF 6210 on 14 Jan. 2004 at 11 a.m. from ORLY to NICE
Inbound 2
Flight No. AF AF6203 on 18 Jan. 2004 at 8.10 a.m. from NICE to ORLY
Fare proposal:
Fare family: AF POUR TOUS
Per adult:
Total price: 149.66 Euros
Tax: 40.66 Euros
N.B.: "Tickets cannot be exchanged before departure"
Price details:

3rd table

|  | Fare class | Class | Cabin | Type of fare | Type of passenger | Fare family |
|---|---|---|---|---|---|---|
| Outbound flight | WAP10 | W | Y | Public | Adult | AFPOURTOUS |
| Inbound flight | WAP10 | W | Y | Public | Adult | AFPOURTOUS |

Per child:
Total price: 95.66 Euros
Tax: 40.66 Euros
N.B.: "Tickets cannot be exchanged before departure"
Price details:

4th table

|  | Fare class | Class | Cabin | Type of fare | Type of passenger | Fare family |
|---|---|---|---|---|---|---|
| Outbound flight | WAP10 | W | Y | Public | Child | AFPOURTOUS |
| Inbound flight | WAP10 | W | Y | Public | Child | AFPOURTOUS |

These recommendations can be grouped as follows:
Group of travel products 1:
Travel solutions:
Travel product 1: Outbound 1/Inbound 1
Travel product 2: Outbound 2/Inbound 2
Fare proposal:
Fare family: AF POUR TOUS
Per adult:
Total price: 149.66 Euros
Tax: 40.66 Euros
N.B.: "Tickets cannot be exchanged before departure"
Price details:

5th table

|  | Fare class | Class | Cabin | Type of fare | Type of passenger | Fare family |
|---|---|---|---|---|---|---|
| Outbound flight | WAP10 | W | Y | Public | Adult | AFPOURTOUS |
| Inbound flight | WAP10 | W | Y | Public | Adult | AFPOURTOUS |

Per child:
Total price: 95.66 Euros
Tax: 40.66 Euros
N.B.: "Tickets cannot be exchanged before departure"
Price details:

6th table

|  | Fare class | Class | Cabin | Type of fare | Type of passenger | Fare family |
|---|---|---|---|---|---|---|
| Outbound flight | WAP10 | W | Y | Public | Child | AFPOURTOUS |
| Inbound flight | WAP10 | W | Y | Public | Child | AFPOURTOUS |

With the following proposed segments:
Outbound 1:
Flight No. AF 6208 on 14 Jan. 2004 at 10 a.m. from ORLY to NICE
Outbound 2:
Flight No. AF 6210 on 14 Jan. 2004 at 11 a.m. from ORLY to NICE
Inbound 1:
Flight No. AF 6213 on 18 Jan. 2004 at 12.10 p.m. from NICE to ORLY
Inbound 2:
Flight No. AF 6203 on 18 Jan. 2004 at 8.10 a.m. from NICE to ORLY From this group of two travel products, the Internet server can propose two additional travel products for the same fare:
Travel product 3: Outbound 1/Inbound 2
Travel product 4: Outbound 2/Inbound 1
Below is another example in which the combination of travel solutions is impossible because travel solutions do not comply with the applicable combining rules.

EXAMPLE 2

Grouping of Travel Products

For a request for a SYDNEY-SINGAPORE flight on 11 Feb. 2004 for one adult, the following travel products are proposed:
Travel product 1:
Travel solutions:
Outbound 1
Flight No. QF411 on 11 Feb. 2004 at 2.30 p.m. from SYDNEY to MELBOURNE
Flight No. QF9 on 11 Feb. 2004 at 5.10 p.m. from MELBOURNE to SINGAPORE
Inbound 1
Flight No. QF52 on 18 Feb. 2004 at 9.10 p.m. from SINGAPORE to BRISBANE
Flight No. QF86 on 19 Feb. 2004 at 7.55 &.m. from BRISBANE to SYDNEY
Fare proposal:
Fare family: EXCURSION
Per adult:
Total price: 805.93 Euros
Tax: 63.93 Euros
N.B.: "Tickets cannot be exchanged before departure"
Price details:

|  | Fare class | Class | Cabin | Type of fare | Type of passenger | Fare family |
|---|---|---|---|---|---|---|
| Outbound flight | KLEE35 | K | Y | Public | Adult | EXCURSION |
|  | KLEE35 | K | Y | Public | Adult | EXCURSION |
| Inbound flight | KLEE35 | K | Y | Public | Adult | EXCURSION |
|  | KLEE35 | K | Y | Public | Adult | EXCURSION |

Travel product 2:
Travel solutions:
Outbound 2
Flight No. QF524 on 11 Feb. 2004 at 12.05 p.m. from SYDNEY to BRISBANE
Flight No. QF51 on 11 Feb. 2004 at 2 p.m. from BRISBANE to SINGAPORE
Inbound 2
Flight No. QF10 on 18 Feb. 2004 at 8.05 p.m. from SINGAPORE to MELBOURNE
Flight No. QF416 on 19 Feb. 2004 at 8.30 a.m. from MELBOURNE to SYDNEY
Fare proposal:
Fare family: EXCURSION
Per adult:
Total price: 805.93 Euros
Tax: 63.93 Euros
N.B.: "Tickets cannot be exchanged before departure"
Price details:

|  | Fare class | Class | Cabin | Type of fare | Type of passenger | Fare family |
|---|---|---|---|---|---|---|
| Outbound flight | KLEE35 | K | Y | Public | Adult | EXCURSION |
|  | KLEE35 | K | Y | Public | Adult | EXCURSION |
| Inbound flight | KLEE35 | K | Y | Public | Adult | EXCURSION |
|  | KLEE35 | K | Y | Public | Adult | EXCURSION |

These travel products cannot be grouped because the stopovers are not the same; the outbound journey goes via MELBOURNE and the inbound one via BRISBANE for travel product 1, whereas the outbound journey is via BRISBANE and the inbound via MELBOURNE for travel product 2.

To carry out the processing of the invention, the databases described above can be used i.e. travel segment database (FDB), fare database (TDB) and the fare family database (FFDB).

These databases can be accessed by search engines, in particular by a fare search engine MT, a grouping search engine MG and a travel solutions search engine MF.

Figure 7:
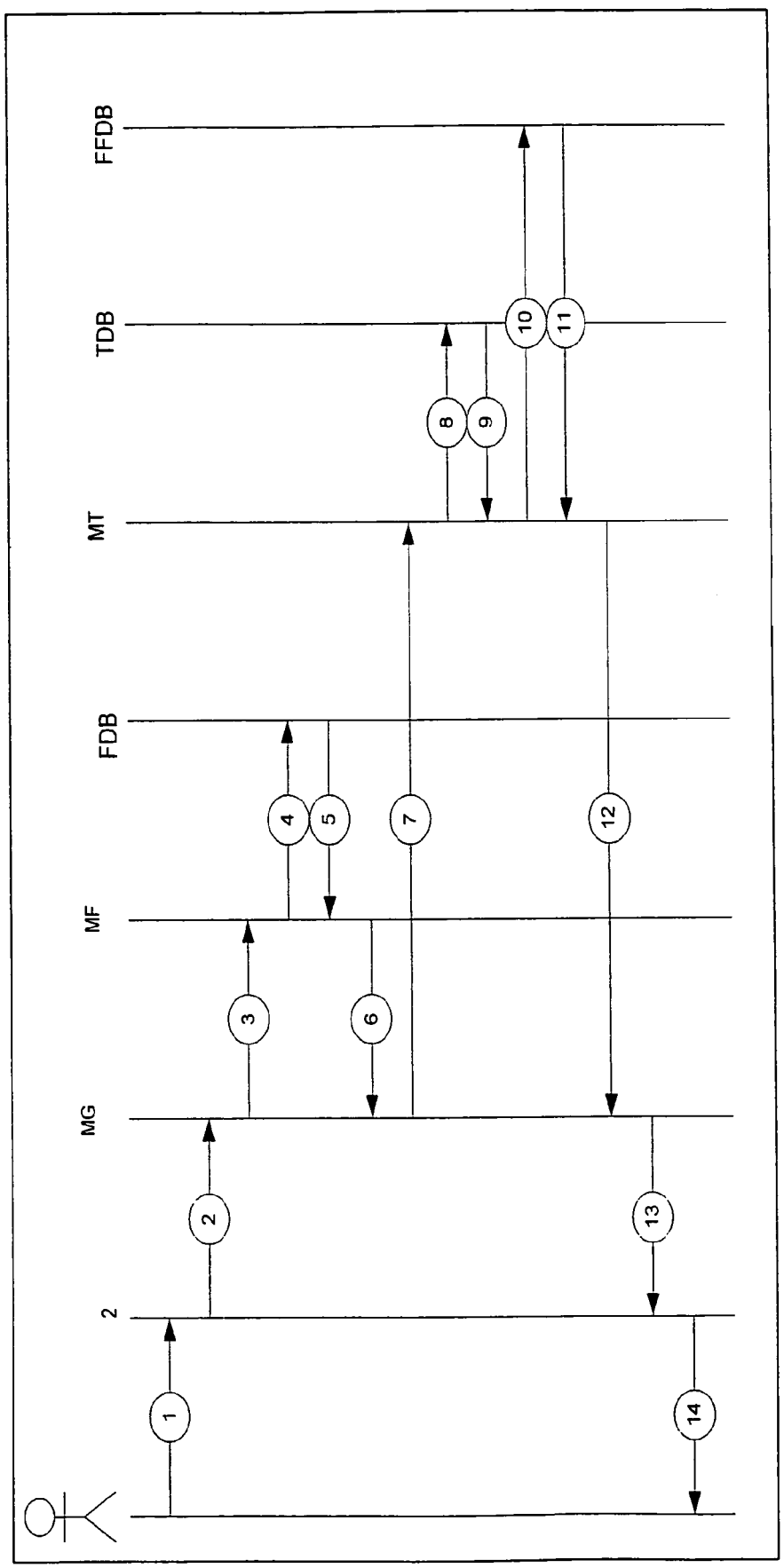
FIG. 7 shows one example of successive stages in the implementation of the invention.

We now provide a more detailed description of the possible stages in the processing of the invention, by reference to FIG. 7.

❶ In this figure, the user inputs a request for travel solutions for a Is given travel itinerary, specifying the dates of travel and the preferred starting points and destination. The user can also input other preferences (stopover, preferred class in fare family etc.). This input is entered on user terminal 1 and addressed to Internet server 2 for processing.

❷ Internet server 2 retranscribes the request, formats it and forwards it to the grouping engine (MG) for travel solutions. Using Internet server 2, default options and request identification data can be added.

❸ Based on the data input, the grouping engine (MG) sends a request to the travel solutions engine (MF) to determine various travel solutions.

❹ The travel solutions engine (MF) asks the travel segment database (FDB) to extract the corresponding outbound and inbound segments.

❺ The outbound and inbound segments corresponding to the input criteria are returned by the travel segment database (FDB) to the travel solutions engine (MF).

❻ The travel solutions are then created by combining outbound and inbound segments from the travel segment database (FDB) and the solutions are sent back to the grouping engine (MG).

❼ The grouping engine (MG) forwards a request to the fare search engine (MT) to determine travel products by sending the initial input criteria and the travel solutions determined by the travel solutions engine (MF).

❽ The fare search engine (MT) forwards a request to the fare database (TDB) to determine the fares corresponding to the travel solutions.

❾ The current fares are returned to the fare search engine (MT) by the fare database (TDB).

❿ The fare search engine (MT) forwards a request to the fare family database (FFDB) to determine the fare families that correspond to the input criteria for this request.

⓫ The corresponding fare families are returned to the fare search engine (MT).

⓬ The fare search engine (MT) calculates possible fares by combining fares. Travel products are then created by combining one fare solutions to the previously-created travel solutions. The fare search engine (MT) then returns the newly-created travel products to the grouping engine, indicating the fare family to which they are combining.

❽ The grouping engine (MG) groups various travel products corresponding to the defined rules and returns these groups to Internet server (2).

❾ Internet server (2) extracts groups of travel products, the list of possible outbound segments and the list of possible inbound segments, with the corresponding fare family. Using the application embedded in user terminal 1, the user can display the various outbound and inbound journeys independently, listed by price.

In the above case, the application implemented in user terminal 1 does not require any particular configuration of the terminal since it is a browsing application of the Internet Explorer type (registered trademark). This browser can supply the graphic interface that corresponds to the user's request.

FIG. 4 gives one example of the interface produced as a result of the previous stages.

This display is produced for each fare family (in the case represented, travel solutions corresponding to the FF1 fare family are displayed and the user can access to the fare family solutions FF2, FF3, FF4 and FF5 categories by clicking on the relevant signet by inputing on user terminal 1.

In the case represented, classification by fare is proposed and only the journey at 1,295 dollars is displayed.

Similarly, instead of producing a display based on fare families in ascending order, it is possible to display solutions at higher fares by clicking on the corresponding zone i.e. 1,695 dollars, 1,950 dollars, 2,190 dollars and 2,290 dollars.

Note that the user can select any outbound flight and any inbound flight as displayed in FIG. 4 to create a personalised travel solutions at the previously quoted fare of 1,295 dollars.

FIGS. 6a, 6b show an additional embodiment of the present invention, wherein the information provided in response to the client's request is displayed in a different graphic form.

In the case of FIG. 6a, few travel solutions are proposed but solutions are present and displayed simultaneously at various fares in various fare families (FF1, FF2, FF3, FF4, FF5).

If the user wishes further information i.e. more proposition for travel solutions within one of the family displayed, a link (illustrated as "more flights") provides access to an additional window shown in FIG. 6b, in which additional solutions of outbound segments and inbound segments are viewed, offering a wider choice to select travel solutions.

Still as a preference but without limitation, the present invention can use a calendar function to help the user create the input criteria indicated above, in a two-stage operation.

Figure 2:
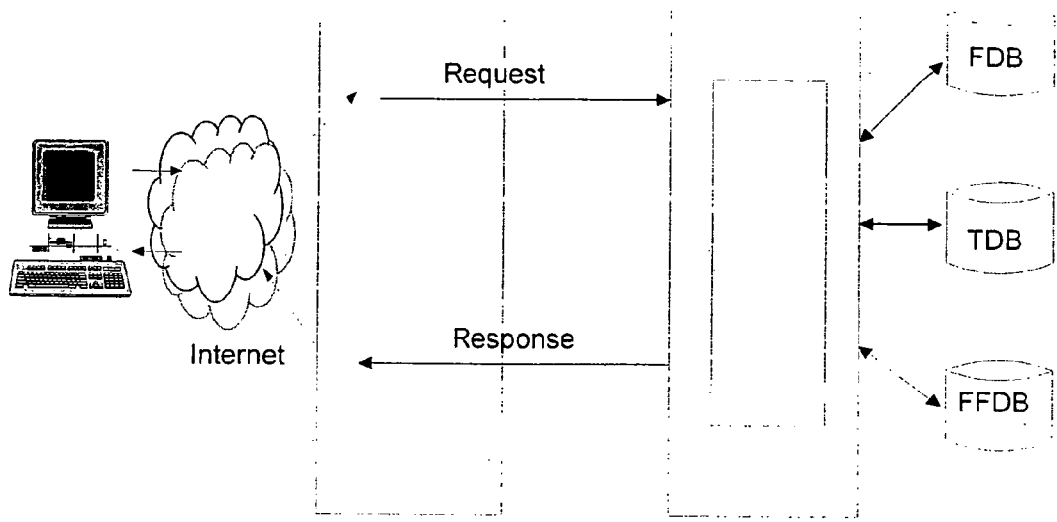
FIG. 2 shows the formulation of a preliminary request with a calendar function.

As shown in FIG. 2, the user starts by inputting a general request on user terminal 1. This request is then forwarded by Internet server 2 at the stage of application 3.

A calendar application 4 (shown diagrammatically in FIG. 1) returns initial information to the user in the form of a response as illustrated in FIG. 5.

In this Figure, a date range corresponding to the range in the user request is displayed for the outbound journey and the inbound journey.

For each pair of outbound/inbound dates, the display of the travel solution having the lowest fare is produced.

The user can then see the combination of dates for the travel having the lowest fare, represented in a very schematic manner.

The user can also choose the best possible compromise and the most convenient dates.

After selecting a pair of Outbound/Inbound dates by clicking on the intersection box, user terminal 1 runs its browser to return a request that includes the input criteria required for the processing described above.

Figure 3:
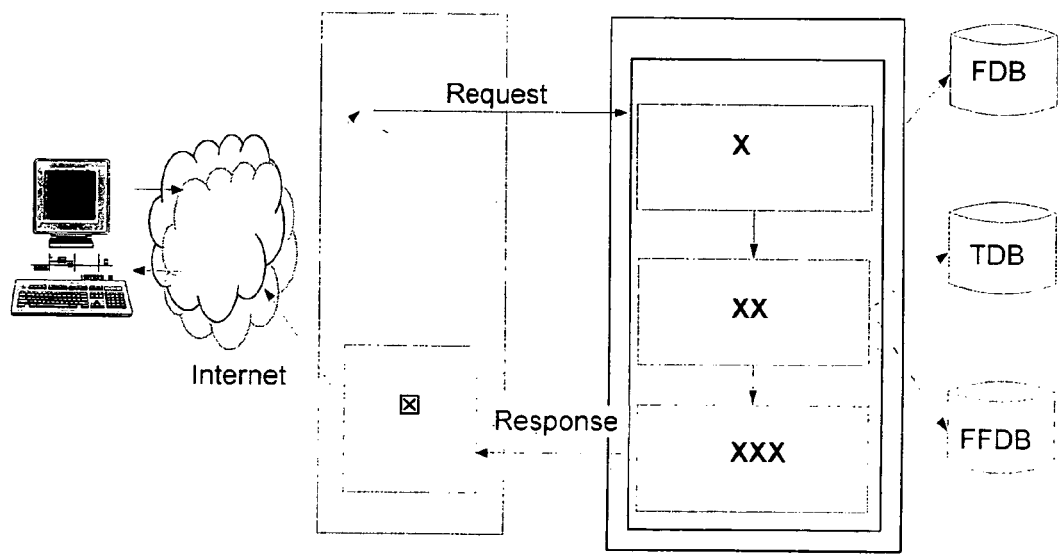
FIG. 3 illustrates the transmission of request and response flows through one invention device in accordance with the preferred embodiment.

Processing then takes place in a manner more or less identical to FIG. 3 and described in greater detail above, in particular by reference to FIG. 7.

REFERENCES

| | |
|---|---|
| 1. | User terminal |
| 2. | Internet server |
| 3. | Server application |
| 4. | Calendar application |
| 5. | Wide-ranging network |
| FDB | Travel segment database |
| TDB | Fare database |
| FFDB | Fare family database |
| MT | Fare search engine |
| MG | Grouping engine |
| MF | Travel solutions search engine |

The invention claimed is:

1. A reservation device configured to respond to receipt of input criteria including a travel itinerary, the reservation device comprising:
a travel segment database;
a fare database; and
a computer system configured to be accessible from a user terminal, the computer system comprising:
a travel solutions search engine configured to access the travel segment database and determine a plurality of outbound travel segments and a plurality of inbound travel segments complying with the travel itinerary of the input criteria, the travel solutions search engine configured to determine a plurality of travel solutions by combining the outbound travel segments and the inbound travel segments in pairs through application of a plurality of combining rules;
a fare search engine configured to access the fare data base and determine a fare for association with each travel solution to define one of a plurality of travel products each having a sales price; and
a grouping engine configured to apply grouping criteria including at least one fare equivalence criterion to define a group of the travel products, to determine a plurality of combinations of the outbound travel segments and the inbound travel segments of the travel products in the group to define additional travel products, and to add the additional travel products as members of the group.

2. The device according to claim 1, further comprising:
a fare family database containing a plurality of family rules to determine for each travel fare an association with at least one fare family, said fare family database being accessible via the fare search engine to sort travel products on the basis of fare family.

3. The device according to claim 2, wherein, the fare family database includes commercial classes of fare families linking one group of fare family to a predefined geographical market, for a predefined set of requested dates.

4. The device according to claim 3, wherein the fare search engine is configured to select at least one commercial class of fare families to determine travel products that meet the input criteria.

5. The device according to claim 2, wherein the grouping criteria include at least one criterion of an identical fare family.

6. The device according to claim 1, wherein the input criteria includes a range of outbound journey dates or a range of inbound journey dates, and further comprising a computer terminal configured to determine the travel product having the lowest fare via a calendar application for each combination of outbound journey date and inbound journey date, produce a display of data relating to the travel product that complies with the input criteria and has the lowest fare, for each combination of the outbound journey dates and the inbound journey dates, and integrated a user-selected one of said combinations into the input criteria.

7. The device according to claim 1, wherein, the fare search engine is configured to determine, as a first step, the fare for travel solutions that have no common outbound or inbound segments.

8. The device according to claim 1, wherein the grouping criteria are identical legs of the segments, identical total price per passenger, or identical fare parameters.

9. A method for responding to input criteria including a travel itinerary the method comprising
   determining via a computer system by access to a travel segment database a plurality of outbound travel segments and a plurality of inbound travel segments complying with the travel itinerary of the input criteria;
   determining a plurality of travel solutions by combining the outbound travel segments and the inbound travel segments in pairs through application of a plurality of combining rules;
   determining, by accessing a fare database with the computer system, a fare associated with each travel solution to define one of a plurality of travel products each having a sales price;
   grouping travel products via the computer system by applying grouping criteria including at least one fare equivalence criterion to define a group of the travel products;
   determining via the computer system a plurality of combinations of the outbound travel segments and the inbound travel segments to define additional travel products; and
   adding the additional travel products as members of the group.

10. The method according to claim 9, further comprising:
    accessing a fare family database containing a plurality of family rules to associate each fare an association with a fare family; and
    sorting the travel products per fare family.

11. The method according to claim 10, further comprising:
    creating a plurality of commercial classes of fare families linking the travel products of each fare family to a predefined geographical market in the fare family database for a predefined set of requested dates.

12. The method according to claim 11, further comprising:
    selecting one or more commercial classes of fare families are selected to determine which travel products meet the input criteria.

13. The method according to claim 10, wherein the travel products belonging to the same fare family are grouped.

14. The method according to claim 9, further comprising:
    receiving a user request including range of outbound journey dates or a range of inbound journey dates;
    processing the user request using a calendar application that determines the travel product having the lowest fare for each combination of outbound journey dates and inbound journey dates;
    producing a display of data relating to the travel product that complies with the request and has the lowest fare, for each combination of outbound journey dates and inbound journey dates, on the user terminal;
    selecting, with the user terminal, a travel product for one combination; and
    sending the combination to the computer system.

15. The method according to claim 9, wherein determining, by accessing the fare database with the computer system, the fare associated with each travel solution comprises:
    starting with the travel solutions that have no common outbound segment or no common inbound segment.

16. The method according to claim 9, wherein the grouping criteria are identical legs of the segments, identical total price per passenger, or identical fare parameters.

17. The method according to claim 9, further comprising:
    displaying information for a predefined number of outbound segments and inbound segments in a group of travel products;
    displaying a message proposing to display information for other outbound segments and inbound segments in a group of travel products; and
    displaying, in response to an input of an instruction by the user, information produced for other outbound segments and inbound segments in a group of travel products.

18. The method according to claim 9, further comprising:
    producing a display of information on those travel products having the lowest fare in the group of travel products;
    producing a message proposing to display information for at least one other group of travel products; and
    displaying, in response to an input of an instruction by the user, a display of produced information for said other group of travel products.

19. A non-transitory computer readable medium with a computer program recorded thereon comprising program instructions, when run by a computer, to perform a method, the method comprising:
    determining, by access to a travel segment database, a plurality of outbound segments and a plurality of inbound segments complying with a travel itinerary;
    determining a plurality of travel solutions by combining the outbound travel segments and the inbound travel segments in pairs through application of a plurality of combining rules;
    determining, by access to a fare database, a fare associated with each travel solution to define one of a plurality of travel products each having a sales price;
    grouping travel products by applying grouping criteria including at least one fare equivalence criterion to define a group of the travel products;
    determining via the computer system a plurality of combinations of the outbound travel segments and the inbound travel segments to define additional travel products; and
    adding the additional travel products as members of the group.

* * * * *

UNITED STATES PATENT AND TRADEMARK OFFICE
CERTIFICATE OF CORRECTION

| | | |
|---|---|---|
| PATENT NO. | : 8,428,980 B2 | Page 1 of 1 |
| APPLICATION NO. | : 11/597472 | |
| DATED | : April 23, 2013 | |
| INVENTOR(S) | : Thierry Blaszka | |

It is certified that error appears in the above-identified patent and that said Letters Patent is hereby corrected as shown below:

In the Specification:

At column 2, line number 43, change "calculate" to --calculates--.

At column 6, line number 46, change "solutions" to --solution--.

Column 7, line number 55, after "fare" insert a hard return and at line number 58, change "solutions" to --solution--.

Column 12, line number 67, change "solutions" to --solution--.

Column 13, line number 35, change "solutions" to --solution--.

In the Claims:

At column 15, claim number 6, line number 14, change "integrated" to --integrate-- and at claim number 9, line number 24, after "itinerary", insert --,--.

Signed and Sealed this
Ninth Day of July, 2013

Teresa Stanek Rea
*Acting Director of the United States Patent and Trademark Office*